April 16, 1935.   F. INMAN   1,997,795

MEAT TENDERING DEVICE

Filed Sept. 17, 1931

Inventor
Frank Inman
By Chindahl, Parker & Carlson
Attorneys

Patented Apr. 16, 1935

1,997,795

UNITED STATES PATENT OFFICE 1,997,795

MEAT-TENDERING DEVICE

Frank Inman, Rockford, Ill.

Application September 17, 1931, Serial No. 563,302

2 Claims. (Cl. 17—30)

This invention relates generally to a device for tendering meats such as steaks, chops, cutlets, roasts, hams, bacon, and other meat cuts. It is directed more particularly to a tendering device adapted to operate upon the meat with a rotary or chopping motion.

A general object of this invention is to provide a new and improved tendering device which will work satisfactorily on meat of any thickness without flattening the same, leaving clean cuts or perforations and operating to tender the meat by severing the sinews or fibres thereof rather than by crushing or breaking up the meat cells.

More particularly the invention aims to provide a meat tendering device having rotary knives or cutters in the form of a plurality of thin toothed disks sharpened to keen cutting edges around their entire periphery.

Other objects and advantages will become apparent from the following detailed description taken in connection with the accompanying drawing in which.

Figure 1:
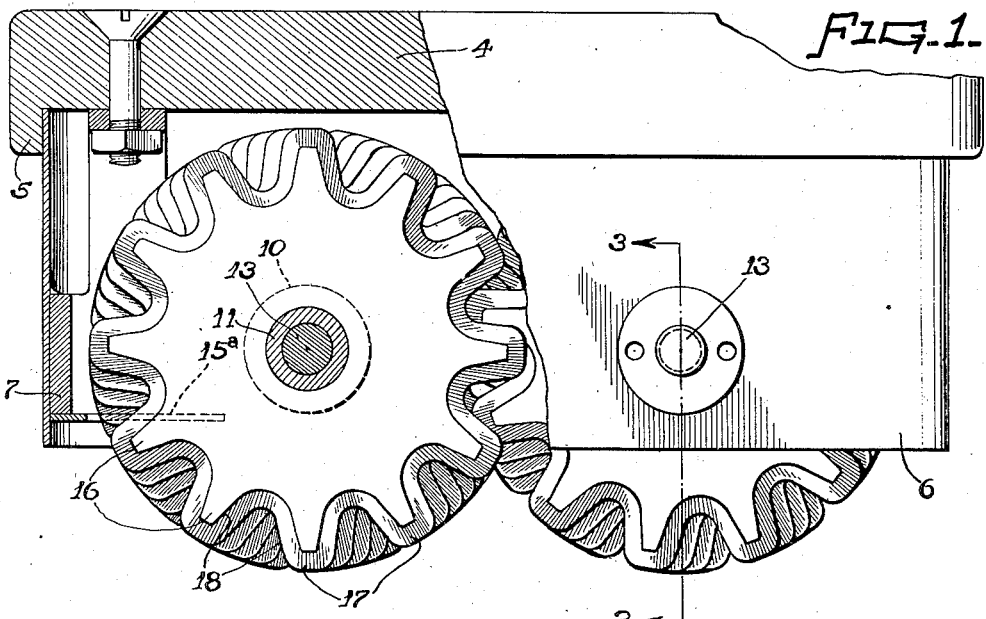
Figure 1 is a side elevational view, with the casing partially broken away, of a meat tendering device embodying the features of my invention.

In the drawing, the invention is illustrated as embodied in a portable tendering device having a handle formed from a rectangular block 4 with a depending flange 5 around the edge thereof. Fitting within and suitably secured to the flange 5, is one edge of a downwardly opening casing 6 which preferably is reinforced by a band 7, secured to and extending around the walls on the inner side thereof, by means of which the casing is secured in place.

Supported within the casing is the tendering means proper which, in this instance, is in the form of two cylindrical cutters 8 rotatably supported by the side walls of the casing with a substantial portion of their peripheries projecting outwardly beyond the bottom of the casing. Though two such cutters are preferably employed for reasons which will appear later, the number is not material and may be varied at will depending upon the size of the tendering device desired.

Each of the cutters 8 comprises a plurality of blades in the form of thin metal disks 9 of uniform thickness held in uniformly spaced relation by washers 10 and coaxially arranged upon a shouldered sleeve 11 having a nut 12 clamping the disks and spacers rigidly together, thereby forming a cutter which may be inserted in and removed from the open end of the casing 6. This cutter is rotatably supported by a bolt 13 extending through the sleeve 11 and having its opposite ends projecting through the side walls of the casing and the band 7 and removably secured thereto by a nut 14 threading onto one end of the bolt 13.

One of the cutters 8 is here formed of five disks while the other has only four. Such a construction permits the cutters to be positioned with the disks in staggered relationship and overlapping. Twice the number of cuts will thus be made in the meat being tendered without mounting the disks on the individual cutters so close together, as to render the cutters subject to clogging. This tendency of the cutters to become clogged is also avoided by forming the spacers 10 with concave peripheral grooves 15. Since, at the point of overlap, the disks of the two cutters move in opposite directions, the one acts as a stripper for the other and thus prevents the steak from being drawn into the casing. At the ends of the casing 6, stripper plates 15$^a$ secured to the band are provided and extend to a point closely adjacent the hub of the cutter.

It is highly desirable that a device of this character operate effectually on meat of different thickness and that the perforations formed in the meat be of such shape that they will continue to remain open and permit the inner parts of the meat to be heated the same as the outer surfaces during cooking. To this end, the disks 9 are made very thin and formed with teeth 16 having flattened ends 17 of substantial circumferential lengths which form an elongated slit in the side of the meat opposite that over which the tendering device is being operated. In forming these perforations, the fibres of the meat are actually severed by virtue of the fact that each tooth 16 is sharpened along its tapering sides 18 as well as at the end 17.

In order that the device will operate effectually upon cuts of meat of a thickness substantially greater than the radial depth of the teeth 16, the sharpened knife edges are extended around the roots between the teeth so that the entire periphery of the disk is capable of cutting the meat fibres. A continuous slit will therefore be produced in the side of the meat over which the device is operated. This enables the teeth 16 to reach the under side of the meat being tendered without danger of mashing or flattening out the upper portion. By thus producing continuous slits in the upper surface of the meat, this portion will be tendered as effectually as could be done by a knife and yet the meat will be firmly held together because the under side portion will merely be perforated. Owing to the elongated character of the perforations and the slits, the inner portions of the meat will be subjected to the heat continuously in cooking because perforations of this character will not close up but will become seared over upon the initial application of heat, thus retaining the meat juices.

Figure 2:
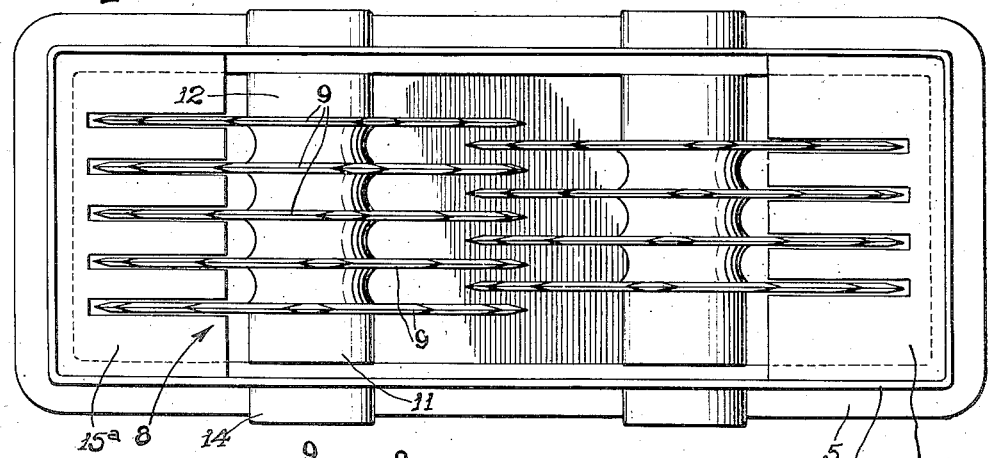
Fig. 2 is a bottom plan view of the device of Fig. 1.
Figure 3:
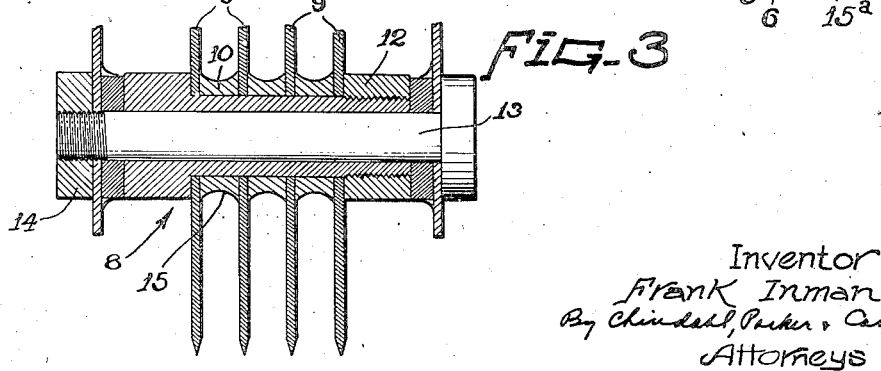
Fig. 3 is a sectional view taken along the line 3—3 of Fig. 1.

To further prevent any portion of the meat from being picked up by the rotating disks 11, the disks are secured on the sleeve 15 with the teeth 16 in angularly spaced relation. That is, the teeth 16 lie in rows diagonally of the axis of the knife as is shown in Fig. 2. With such arrangement, the teeth of each row are withdrawn from the meat successively and not simultaneously, whereby some hold the meat while the others are being withdrawn.

It is thus apparent that I have provided a meat tendering device which will operate with equal efficacy on steaks, chops, cutlets, roasts, or any fibrous meat cuts of widely varying thickness; which cuts the fibres of the meat instead of crushing or mashing them, thereby avoiding an undesirable loss of juice in the cooking process as well as mushrooming of the meat when it first comes in contact with the heat, and which may be run across the meat in a plurality of directions without danger of mincing the meat. The device will operate upon any size of meat cut and does not require that the meat be boned before the tendering operation.

I claim as my invention:

1. A meat tendering device having a rotary cutter comprising a plurality of coaxially arranged axially spaced disks each having a central hub portion and circumferentially spaced teeth projecting radially therefrom having substantially straight outer ends and substantially straight root portions between the adjacent teeth, the entire periphery of said disk including said ends, the sides of said teeth and the intervening edges of said portion being sharpened throughout their lengths to a cutting edge whereby each of said disks will form a continuous cut on the upper side and a row of elongated slits on the under side of an ordinary steak over which said device is rolled.

2. A meat tendering device having a rotary cutter comprising a plurality of coaxially arranged axially spaced disks each having a central hub portion and circumferentially spaced teeth projecting radially therefrom having substantially straight outer ends, and spacing elements between the adjacent disks of diameters such that the radial distance between the elements and the roots between the adjacent teeth will be at least as great as the radial length of the teeth, the entire periphery of said disk including said ends and the sides and roots of said teeth being sharpened throughout their lengths to a cutting edge whereby each of said disks will form a continuous cut on the upper side and a row of elongated slits on the under side of an ordinary steak over which said device is rolled.

FRANK INMAN.